S. W. CLARK.
SPRING SEAT.
APPLICATION FILED OCT. 22, 1918.

1,305,771. Patented June 3, 1919.

Witnesses

Inventor
S. W. Clark
By Victor J. Evans
Attorney

UNITED STATES PATENT OFFICE.

SHERMAN W. CLARK, OF WAPATO, WASHINGTON.

SPRING-SEAT.

1,305,771.     Specification of Letters Patent.     Patented June 3, 1919.

Application filed October 22, 1918. Serial No. 259,229.

*To all whom it may concern:*

Be it known that I, SHERMAN W. CLARK, a citizen of the United States, residing at Wapato, in the county of Yakima and State of Washington, have invented new and useful Improvements in Spring-Seats, of which the following is a specification.

This invention relates to seats for agricultural machines, and has for its object the provision of a spring seat so constructed as to take up the shocks and jars incidental to travel of the machine over rough and uneven ground and over the irrigation ditches common in certain sections of the country.

An important object is the provision of a seat of this character in which the seat proper is suspended by a plurality of suitably arranged frames within a relatively rigid supporting frame secured upon the agricultural machine.

A further object is the provision of a seat of this character which will be simple and inexpensive in construction and installation, which will be highly efficient and durable in use, and a general improvement in the art.

With the above and other objects and advantages in view, the invention consists in the details of construction to be hereinafter more fully described and claimed, and illustrated in the accompanying drawings in which:—

Figures 1, 2:
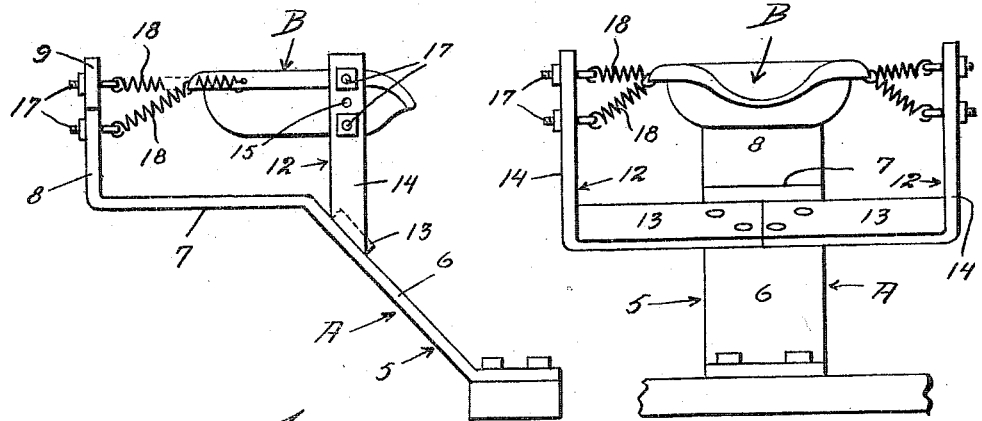
Figure 1 is a plan view of a seat constructed in accordance with my invention.
Fig. 2 is a front elevation thereof.
Figures 3, 4:
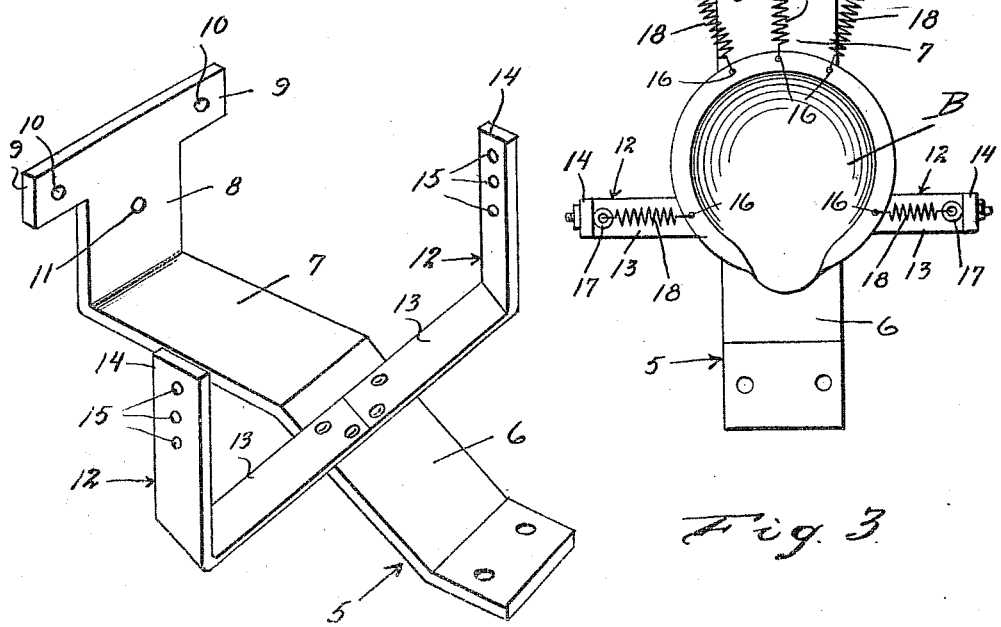
Fig. 3 is a side elevation.
Fig. 4 is a perspective view of the frame with the seat and springs removed.

Referring more particularly to the drawing I have shown my construction as comprising a relatively fixed frame A and a suspension seat proper.

The supporting frame A comprises a suitable bar 5 secured at the proper location upon the agricultural machine and formed preferably somewhat angular in shape so as to provide an upwardly and rearwardly inclined portion 6 and a horizontal portion 7. A vertically extending back portion 8 is formed integrally upon the rear portion of the horizontal portion 7 and has formed at the sides of its other end laterally extending ears 9 provided with holes 10. Adjacent its central portion, the back member 8 is provided with a hole 11 arranged in a lower plane than the holes 10.

Secured upon the inclined portion 6 of the main supporting bar 5 are substantially L-shaped brackets 12 which have their horizontal arms bolted upon the inclined portion 6 and which have their vertical arms 14 disposed upon opposite sides of the bar 5. Each arm 14 is provided with a plurality of holes 15 arranged in vertical rows.

The seat proper, designated by the letter B is of the type ordinarily used upon agricultural machines and has its rim portion provided with a plurality of suitably spaced holes 16.

In assembling the seat, I provide a plurality of eye-bolts 17 engaged within the holes 10, 11, and 15. Engaged within the eyes of these bolts are springs 18 which have their other ends engaged within the holes 16 in the seat proper. The seat B will thus be suspended within the frame A in such a way that the springs 18 will absorb the shocks and jars incidental to the travel of the machine over rough or uneven ground or over the irrigation ditches, commonly provided in certain sections of the country. It will be noted that the specific arrangement of the springs 18 is such that four of the springs will be disposed in the same horizontal plane and that the remaining three will be disposed in a lower plane and will serve to brace the seats proper so as to prevent side sway thereof. It will also be noted that the provision of the eye-bolts 17 enables the springs to be adjusted to a certain extent so as to vary the tension thereon.

From the foregoing description and a study of the drawing it will be apparent that I have thus provided an extremely simple arrangement whereby the seat proper will be suspended by a plurality of springs from a relatively rigid frame, this construction affording ample resilience to insure the comfort of the rider regardless of the character of the ground traveled over.

While I have shown and described the preferred embodiment of the invention, it will of course be readily understood that I reserve the right to make such changes in the form, construction and arrangement of parts as will not depart from the spirit of the invention nor the scope of the subjoined claims.

Having thus described my invention I claim:—

1. A spring seat comprising a relatively stationary frame including a main supporting bar, a vertically extending back portion formed on one end of the bar, side members formed as brackets secured to said bar, a plurality of springs connected with said back portion and said side members, and a seat proper disposed within said frame and connected with the other ends of said springs, the points of connection of certain of said springs with said back and side members being in different planes.

2. A seat of the character described comprising a main supporting bar including an inclined and a horizontal portion, a vertically extending back portion formed on the end of said horizontal portion, laterally extending ears formed on the sides of said back portion at its upper end, said back portion and said ears being provided with holes, a pair of substantially L-shaped brackets having each of their horizontal arms secured upon said inclined portion and having their other arms moved at the sides of said main supporting bar, said other arms of said brackets being provided with holes, eye-bolts engaged within the holes in said ears, said back portions and said arms, a seat proper disposed between said back portion and said brackets, and a plurality of springs connected at one end with said eye-bolts and at their other ends with said seat proper.

In testimony whereof I affix my signature.

SHERMAN W. CLARK.

Copies of this patent may be obtained for five cents each, by addressing the "Commissioner of Patents, Washington, D. C."